United States Patent [19]

Liu

[11] Patent Number: 5,720,288
[45] Date of Patent: Feb. 24, 1998

[54] METHOD AND APPARATUS FOR DISPLAYING AN ULTRASOUND IMAGE WITH AN IMPROVED DYNAMIC RANGE

[75] Inventor: Dong-Chyuan Liu, Mercer Island, Wash.

[73] Assignee: Siemens Medical Systems, Inc., Iselin, N.J.

[21] Appl. No.: 719,058

[22] Filed: Sep. 24, 1996

[51] Int. Cl.[6] .................................................. A61B 8/00
[52] U.S. Cl. ................................................ 128/660.07
[58] Field of Search ...................... 367/110; 128/660.05, 128/660.04, 916, 660.07, 660.08, 660.09, 660.1

[56] References Cited

U.S. PATENT DOCUMENTS

| | | | |
|---|---|---|---|
| 4,179,681 | 12/1979 | Zehner et al. | 367/110 |
| 4,690,150 | 9/1987 | Mayo, Jr. | 128/660.04 |
| 4,998,165 | 3/1991 | Lindstrom | 128/660.1 |
| 5,329,929 | 7/1994 | Sato et al. | 128/916 |

*Primary Examiner*—George Manuel

[57] ABSTRACT

The present invention is an ultrasound imaging system that displays images with improved dynamic range. An echo signal is sampled so that each sample contains at least N bits in order to create a digital echo signal having at least $2^N$ possible values that determine a dynamic range of the digital echo signal. A single-color lookup table is generated having approximately $2^N$ RGB component entries, each entry defining a pixel having a unique hue, intensity, and saturation value. Each sample of the digital echo signal is mapped to an RGB component entry of the single-color lookup table, and the mapped RGB components are displayed on the display to produce a single-color image having a dynamic range that is substantially equal to the dynamic range of the digital echo signal.

10 Claims, 10 Drawing Sheets

|  |  |  |  |
|---|---|---|---|
| ADDRESS | R | G | B |
| ⋮ | ⋮ | ⋮ | ⋮ |
| 1544 | 253 | 193 | 132 |
| 1545 | 252 | 193 | 133 |
| 1546 | 251 | 193 | 134 |
| 1547 | 250 | 193 | 135 |
| 1548 | 250 | 193 | 136 |
| 1549 | 252 | 193 | 135 |
| 1550 | 251 | 193 | 136 |
| 1551 | 253 | 194 | 134 |
| 1552 | 252 | 194 | 135 |
| 1553 | 253 | 194 | 135 |
| 1554 | 252 | 194 | 136 |
| 1555 | 251 | 194 | 137 |
| 1556 | 250 | 194 | 138 |
| 1557 | 253 | 194 | 136 |
| 1558 | 252 | 194 | 137 |
| 1559 | 251 | 194 | 138 |
| ⋮ | ⋮ | ⋮ | ⋮ |

| ADDRESS | R | G | B |
|---|---|---|---|
| 0000 | 255 | 251 | 248 |
| 0001 | 254 | 251 | 248 |
| 0002 | 253 | 251 | 248 |
| 0003 | 252 | 251 | 249 |
| 0004 | 252 | 250 | 248 |
| 0005 | 253 | 250 | 247 |
| 0006 | 254 | 250 | 246 |
| 0007 | 254 | 249 | 244 |
| 0008 | 253 | 249 | 244 |
| 0009 | 252 | 249 | 245 |
| 0010 | 252 | 248 | 244 |
| ... | ... | ... | ... |

FIG. 5B

| ADDRESS | R | G | B |
|---|---|---|---|
| 0000 | 254 | 180 | 105 |
| 0001 | 253 | 180 | 106 |
| 0002 | 252 | 180 | 107 |
| 0003 | 251 | 180 | 109 |
| 0004 | 254 | 181 | 108 |
| 0005 | 253 | 181 | 109 |
| 0006 | 252 | 181 | 110 |
| 0007 | 251 | 181 | 110 |
| 0008 | 254 | 182 | 109 |
| 0009 | 253 | 182 | 111 |
| 0010 | 252 | 182 | 111 |
| 0011 | 251 | 182 | 113 |
| ... | ... | ... | ... |

FIG. 5C

| ADDRESS | R | G | B |
|---|---|---|---|
| 0000 | 254 | 179 | 103 |
| 0001 | 253 | 179 | 104 |
| 0002 | 252 | 179 | 106 |
| 0003 | 251 | 179 | 107 |
| 0004 | 254 | 180 | 106 |
| 0005 | 253 | 180 | 106 |
| 0006 | 252 | 180 | 107 |
| 0007 | 251 | 180 | 108 |
| 0008 | 254 | 181 | 107 |
| 0009 | 253 | 181 | 109 |
| 0010 | 252 | 181 | 110 |
| 0011 | 251 | 181 | 111 |
| ... | ... | ... | ... |

FIG. 5D

| ADDRESS | R | G | B |
|---|---|---|---|
| 0000 | 254 | 179 | 103 |
| 0001 | 253 | 179 | 104 |
| 0002 | 252 | 179 | 106 |
| 0003 | 251 | 179 | 107 |
| 0004 | 253 | 180 | 106 |
| 0005 | 252 | 180 | 107 |
| 0006 | 251 | 180 | 108 |
| 0007 | 251 | 180 | 109 |
| 0008 | 254 | 181 | 108 |
| 0009 | 253 | 181 | 109 |
| 0010 | 252 | 181 | 110 |
| 0011 | 251 | 181 | 110 |
| ... | ... | ... | ... |

1

METHOD AND APPARATUS FOR DISPLAYING AN ULTRASOUND IMAGE WITH AN IMPROVED DYNAMIC RANGE

FIELD OF THE INVENTION

The present invention relates to ultrasound systems and, more particularly, to ultrasound image displays.

BACKGROUND OF THE INVENTION

Ultrasound is an increasingly used technique for noninvasively examining a patient's body. By transmitting high-frequency acoustic signals into a body, and detecting and analyzing the echo returns, it is possible to produce images of stationary body matter, such as muscle, bone, or organs, as well as images of moving matter such as flowing blood.

In medical ultrasound systems, the strength of an echo signal created in response to an ultrasonic transmission into the body can vary greatly in magnitude. For example, the magnitude of the largest echo signal produced may be approximately 10,000 times the magnitude of the smallest echo signal. A signal having a variation of this magnitude is said to have a dynamic range of 80 dB. To digitally encode a signal, so that the ratio of the largest signal that can be represented compared to the smallest signal is 10,000 to 1, requires that each sample be represented with at least 14 bits ($2^{14}$=16,384). However, most currently available ultrasound systems do not have sufficient processing capability to practicably encode the echo signals with more than 11 bits, in which case each sample of the echo signal may have only one of 2048 ($2^{11}$=2048) possible values or a dynamic range of 66 dB. Encoding the signal with this number of bits causes a reduction in the resolution of the echo signals, i.e., the ability to distinguish between small variations in the echo signal. Further loss of resolution occurs when the echo signals are converted to an ultrasound image that is displayed on a computer monitor.

Most black and white ultrasound monitors use an 8-bit register to store the intensity or brightness of each of the individual pixels in the image. Using 8 bits, the brightest pixel is only 256 ($2^8$) times as bright as the dimmest pixel. This represents a display dynamic range of only 48 dB. Thus, by displaying the echo intensity on a black and white monitor, 32 dB of the echo signal's original 80 dB of dynamic range are typically compressed, and a physician or sonographer viewing the image is unable to distinguish between targets in the body that produce echo signals having slightly varying intensities.

To improve the dynamic range of an ultrasound image, some ultrasound systems display different echo intensities as different colors. This produces an image in which each pixel may have a different color. However, such a system has not proved workable because the human eye is physiologically unable to distinguish the color of objects the size of a single pixel. In addition, displaying multicolor ultrasound images introduces artifacts due to large hue differentials in the resulting multicolored images. Finally, the use of a multicolor display reduces the perception of two visual characteristics found in a single color display. The first characteristic reduced in a multicolored image is naturalness, which is a sense of which colors signify greater intensities. The second characteristic reduced in a multicolor image is associability, which is a characterization of how an echo intensity difference is indicated by degree of perceived color difference.

Another technique used in some ultrasound systems is to produce an ultrasound image having a single color. The intensity of the echo signal is typically mapped to a single color having red-green-blue (RGB) components that are generated by holding constant the hue (dominant wavelength in the pixel) and the saturation (amount of white in the pixel) and varying the intensity. Remapping the image signal to be displayed as a single-color image instead of a multicolored image can overcome the problems of reduced naturalness and associability that arise from the use of a multicolor display. A single-color display increases sensitivity to contrast as compared with a multicolor display, while the use of a single-color display improves upon the naturalness and associability of a grayscale display. However, the dynamic range of a single-color image is still poor because the intensity variations possible in conventional RGB monitors is limited to 8 bits.

Although it would be possible to design a color monitor having a greater dynamic range, the cost would be prohibitive given the size of the potential market for such a display. Therefore, there is a need for a method of increasing the dynamic range of an ultrasound image that does not require the development of a new color monitor.

SUMMARY OF THE INVENTION

The present invention is an ultrasound imaging system that displays images with improved dynamic range. An echo signal is sampled so that each sample contains at least N bits in order to create a digital echo signal having at least $2^N$ possible values that determine a dynamic range of the digital echo signal. A single-color lookup table is generated having approximately $2^N$ RGB component entries, each entry defining a pixel having a unique hue, intensity, and saturation value. Each sample of the digital echo signal is mapped to an RGB component entry of the single-color lookup table, and the mapped RGB components are displayed on the display to produce a single-color image having a dynamic range that is substantially equal to the dynamic range of the digital echo signal.

Because the number of possible intensity and saturation values that can be displayed approximately equals the number of possible digital echo signal values, the dynamic range of the ultrasound image is approximately equal to that of the digitized echo signal.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

The present invention is an ultrasound system that creates and displays an ultrasound image having an increased dynamic range without the use of a specialized monitor. As will be discussed in further detail below, an echo signal is digitized and converted into pixel data that will be displayed in the ultrasound image. Each pixel in the image has a fixed hue but an independently variable intensity and saturation in order to increase the dynamic range of the ultrasound image.

Figure 1:
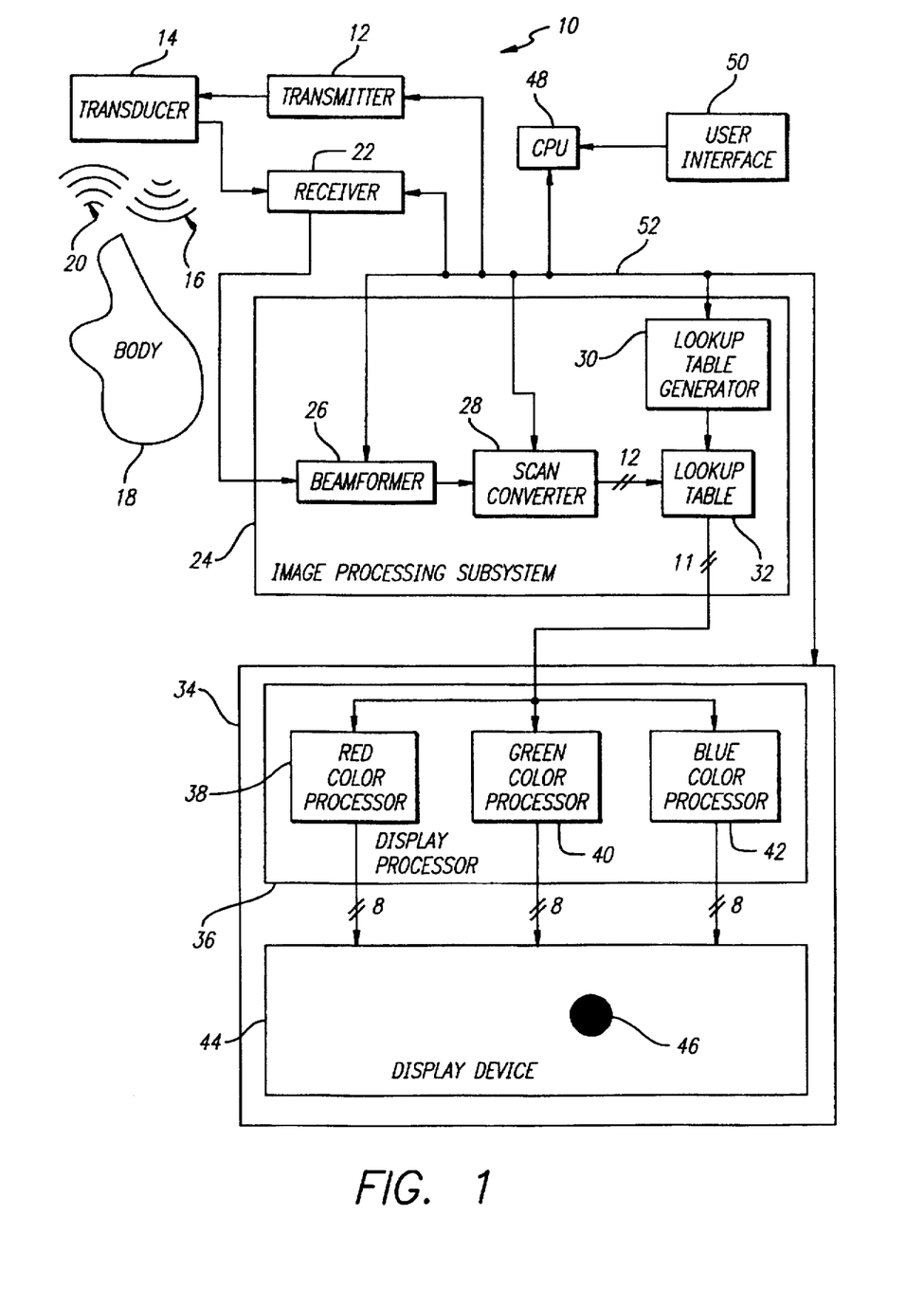
FIG. 1 is a simplified block diagram of an ultrasound system according to the present invention.

Turning now to FIG. 1, an ultrasound system 10 according to the present invention includes a transmitter 12, an ultrasound transducer 14 and a receiver 22. The transmitter 12 generates electronic driving signals that preferably have a frequency between 2 and 10 MHz. The driving signals from the transmitter are coupled to the ultrasonic transducer 14 that typically includes an array of piezoelectric crystals. The application of the driving signals to the piezoelectric crystals causes them to vibrate and produce ultrasonic waves 16 that are transmitted into the body 18 of a patient. The internal structure of the patient's body creates reflected ultrasonic echoes 20 that are received by the transducer and converted to a plurality of corresponding electrical echo signals. The received echo signals are fed to the receiver 22 that digitizes and conditions the echo signals and delivers them to an image processing subsystem 24.

The image processing subsystem 24 operates to convert the echo signals into a series of pixel data that can be displayed on a color monitor. Included in the image processing subsystem 24 is a beam former 26, a scan converter 28 and a lookup table 32. The beam former 26 receives the digitized echo signals produced by the receiver 22, selects samples of one or more of the signals and combines the selected samples to produce a single binary value that is representative of the intensity of an echo 20 at some location in the patient's body 18.

The output of the beam former 26 is fed to the scan converter 28, which translates the combined echo signals into pixel data that will be displayed on a color monitor. The output of the scan converter 28 is used to index a lookup table 32 that stores data indicative of the intensity and saturation values for the pixel that will be used in the ultrasound image. Also included in the image processor 26 is a lookup table generator 30 that generates the data stored in a lookup table 32 stored in a memory of the system 10. The operation of the lookup table 32 and the lookup table generator 30, will be discussed in detail below.

The ultrasound system 10 also includes display subsystem 34. The display subsystem 34 includes a display processor 36 having a separate red color processor 38, a green color processor 40, and a blue color processor 42. The display subsystem 34 also includes a display device, namely, a color monitor 44, that displays a two-dimensional single-color image comprising a number of individual pixels 46. From the ultrasound image, a physician or ultrasound technician is able to view the internal structure of the patient's body 18.

The operation of the ultrasound system 10 is controlled by a central processing unit (CPU) 48 running a suitable computer program stored in a memory circuit. A user interface 50 is connected to the CPU 48 for inputting user commands and entering data. The CPU is connected to the transmitter 12, receiver 22, image processing subsystem 24, and display processing subsystem 34 by a common data/ address bus 52.

In addition to the major components described above, the ultrasound system 10 may include different OEM devices, such as videotape recorders for storing a record of the ultrasound image, a black-and-white or color printer, or one or more disk drives for storing records of the ultrasound echo signals. The ultrasound system 10 may also include a communication link, such as a modem, ethernet card, etc., for transmitting the ultrasound signals to a remote location. The details of the ultrasound system 10 are considered to be well known to those of ordinary skill in the art and need not be considered further except as they relate to the single-color image display aspect of the present invention.

Figure 2:
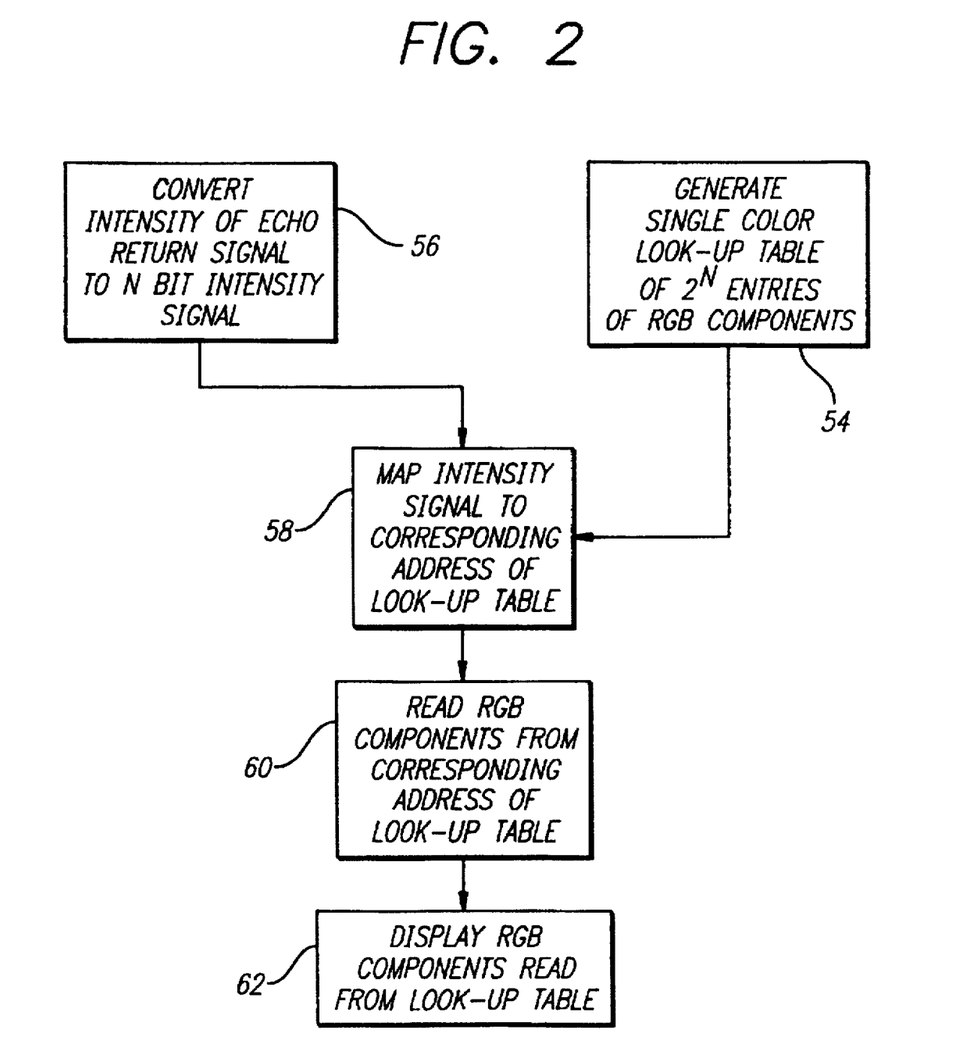
FIG. 2 is a flow chart of steps used by the present invention to create a single-color display.

As indicated above, the ultrasound system 10 transmits a series of ultrasonic sound waves 16 into the patient's body 18 and monitors the magnitude of the received echoes 20 to produce the single-color ultrasound image. FIG. 2 shows a flow chart of steps used by the ultrasound system 10 to create a single-color display with an increased dynamic range according to the present invention. Beginning at a step 54, the lookup table generator 30 generates a single-color lookup table 32 containing $2^N$ entries of red-green-blue (RGB) components that are used to determine how an echo signal with a particular magnitude will be displayed. The lookup table is constructed so that each possible encoding of the digitized echo signal can be displayed in the ultrasound image as a pixel with a fixed hue but with a unique intensity and saturation value. Because the number of possible combinations of intensity and saturation equals the number of possible encodings of the signal, the dynamic range of the ultrasound image equals that of the digitized echo signal.

As will be described below, the lookup table is produced in response to three input parameters, namely, an intensity level, a saturation level, and a saturation range, that are specified by a user. By independently varying intensity and saturation of a pixel in the display, the ultrasound image can be made to have a dynamic range equal to that of the digitized echo signal.

Once the lookup table has been created, the ultrasound system 10 begins receiving the echo signals and digitizing them. As indicated above, the currently preferred embodiment of the invention uses 11 bits for each sample of the echo signals from the scan converter plus 1 bit to indicate the type of display to be produced (1 for B-mode, 0 for color-flow mode). It will be appreciated that the digital signal from the receiver 22 may be encoded with more than 11 bits. For example, the digital signal from the receiver 22 may be a 14-bit signal to correspond to an 80 dB signal dynamic range of the echo signals 20. However, because of limitations due to processing speed, the signal is compressed before scan conversion to an 11-bit signal.

At a step 58, the pixel intensity data produced by the scan converter is mapped to a corresponding address of the lookup table 32. At a step 60, the display processor 36 reads the RGB components from the corresponding address of the lookup table. In a step 62, the display device 44 turns on a pixel having RGB components equal to those read from the lookup table. Because the ultrasound image is constructed as a series of pixel columns, each of which may include one thousand or more pixels, the steps 56–62 are repeated for each pixel in the ultrasound image.

Figure 3:
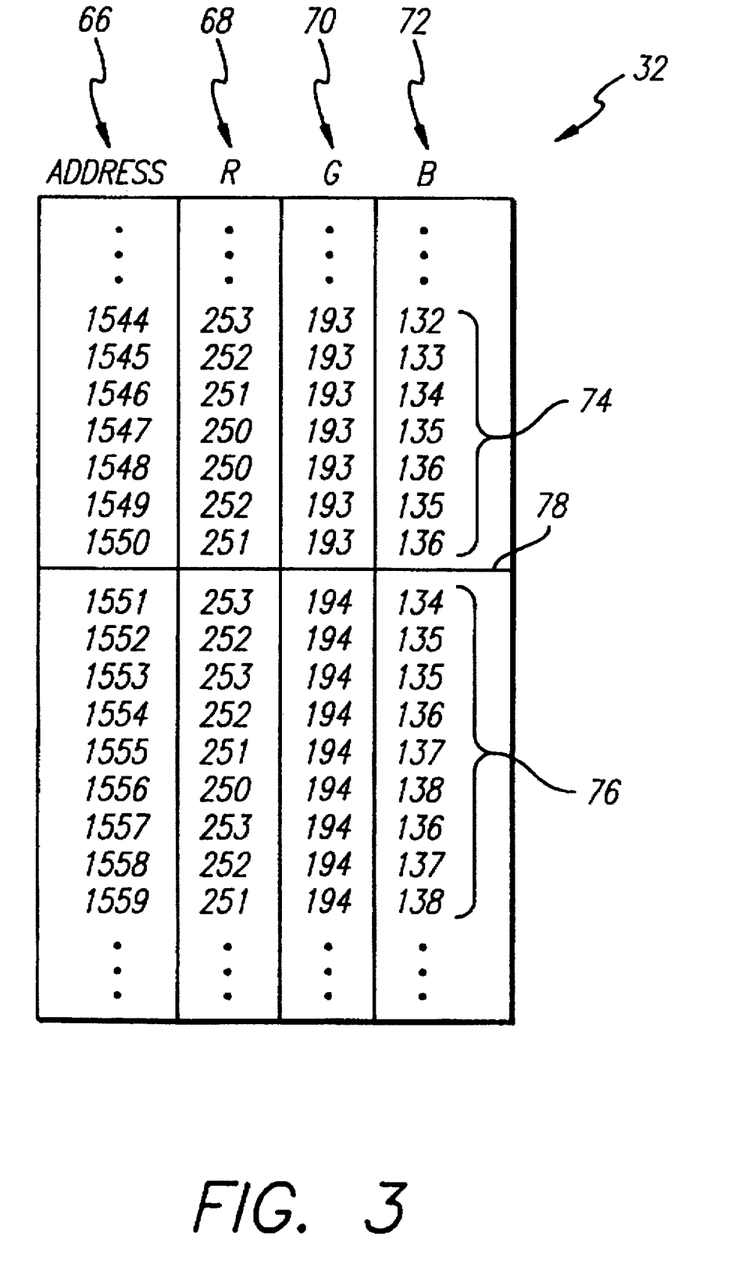
FIG. 3 is a diagram of a single-color lookup table containing blocks of RGB components generated according to the present invention.

FIG. 3 shows a portion of the single-color lookup table 32 that defines the mapping of a pixel value intensity to the RGB components used to create the display. Each entry in the lookup table 32 is indexed by an address 66. Each address corresponds to one of the 2048 possible pixel intensity values that can be produced by the scan converter 28. Associated with each address are three RGB components 68, 70, and 72. The component 66 stores the red component of a pixel while the components 70 and 72 store the green and blue components of the pixel, respectively. The brightness of a pixel is determined by a lightness component of the RGB components.

The lookup table 32 is grouped into processing blocks of RGB components. All the RGB components within a block have the same lightness component, and each processing block has a different lightness component. For example, a block 74 includes all the RGB values having a lightness component equal to 193. Similarly, a block 76 includes all the RGB values having a lightness component equal to 194. A transition point 78 marks the transition between blocks having different lightness components.

Each RGB entry in the lookup table defines a pixel with the same hue and is generated according to the well-known hue-saturation-value (HSV) model. In the presently preferred embodiment of the invention, the hue selected has a value of 0.5, to produce a color found at 30° on a standard color chart between yellow and red. This produces a red-dominant color that is recommended for daylight ultrasound applications. Because a red-dominant color is used in a presently preferred embodiment of the invention, the lightness component of the lookup table 32 is the green component 70. However, any of the red, green, or blue components could be used as the lightness component.

For a fixed hue of 0.5, a saturation S, and a given intensity value V, the RGB components 68, 70, and 72 are computed and stored in the lookup table according to the equation:

$$(RGB) = V(1, 1-0.5S, 1-S) \quad (1)$$

where V is the value of the intensity and S is a saturation level. The saturation level S is the degree to which a color is mixed with white and can range between zero and one. A low saturation contains a large white component, and high saturation means a color having little white component. Full saturation is achieved when one or two of the RGB components have zero intensity. As will be discussed in detail below, instead of keeping the saturation level constant, the present invention varies the saturation level when generating the RGB components 68, 70, and 72 in the lookup table.

As will be appreciated, the present invention is not limited to a single color that is 30° between yellow and red. Any single color may be substituted. For example, a green-dominant color that is 150° between green and cyan can also be used. In this case, the RGB components of the color are given by the equation:

$$(RGB) = V(1-S, 1, 1-0.5S). \quad (2)$$

Another suitable blue-dominant color is found at 270° between blue and magenta. For this color, the RGB components are given by the equation:

$$(RGB) = V(1-0.5S, 1-S, 1). \quad (3)$$

FIGS. 4A–4F comprise a flow chart 80 of the steps used by the lookup table generator 30 during the initial step 54 of generating the single-color lookup table, as shown in FIG. 2. The lookup table generator 30 generates a table of RGB components by implementing the equation (1) given above for varying intensities and saturation levels.

Figure 4A:
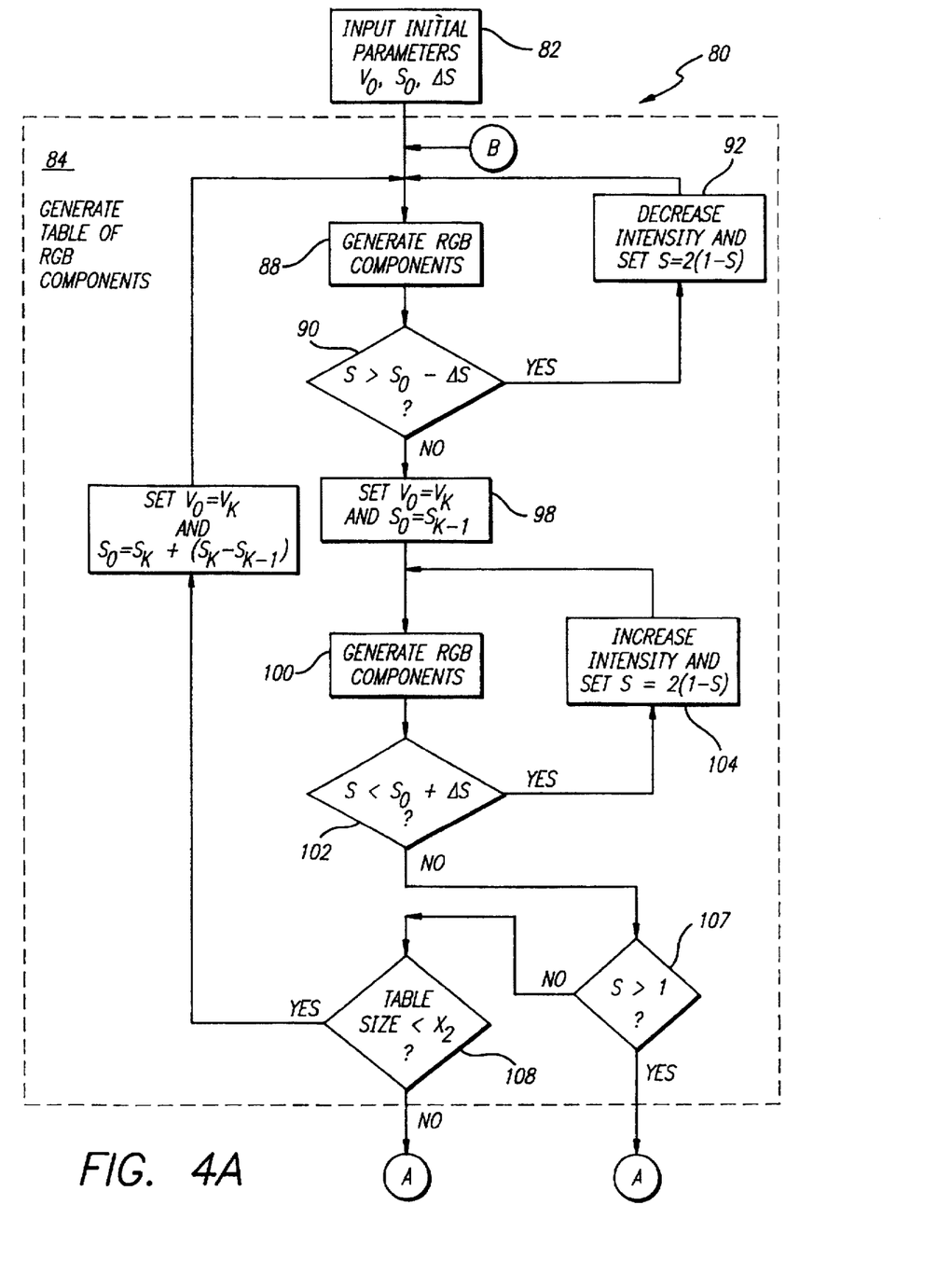
FIGS. 4A–4F are flow charts of steps performed by the present invention to generate the single-color lookup table.

Beginning at a step 82, an initial intensity level $V_0$, an initial saturation level $S_0$, and an initial saturation range $\Delta S$, parameter are received from a user via the user interface 50 (FIG. 1). The initial intensity value $V_0$, is the maximum value that can be mapped to the color monitor used by the ultrasound system. For example, for an 8-bit color monitor, the initial intensity value is $V_0 = 255$.

At a step 88, the RGB components of the lookup table are generated by implementing the equation (1) for the initial intensity, saturation level, and saturation range parameters.

For example, for an initial intensity $V_0$ of 255, an initial saturation $S_0$ of 0.025, and an initial range of saturation $\Delta S$ of 0.02, the step 88 generates a first entry of RGB components having values R=255, G=251, and B=248. At a step 90, a determination is made of whether the saturation level is greater than a first threshold saturation level that is given by the equation:

$$S > S_0 - \Delta S \quad (4)$$

If the saturation is greater than the threshold saturation level, then the intensity is decreased by 1 and the saturation is updated according to the equation:

$$S = 2\left(1 - \frac{G}{V}\right) \quad (5)$$

at a step 92. Another RGB component is then generated for the next address in the table at step 88.

Figure 5A:
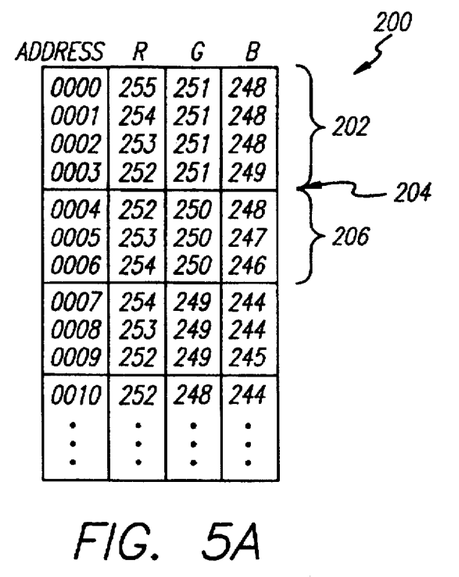
FIGS. 5A–5D illustrate how the single-color lookup table is generated in accordance with the present invention.

The steps 88, 90, and 92 are repeated until the saturation level of the RGB components generated at step 88 is outside the relationship given in equation (4) above. The result of the loop comprising steps 88, 90, and 92 is shown in FIG. 5A, where a lookup table 200 contains a block of K RGB values 202, each of which has the same lightness or G component. It will also be appreciated that the saturation level for the RGB components in the first processing block 200 is decreasing until a transition point 204 is reached when the saturation is outside the relationship given in equation (4) above.

Returning now to FIG. 4A the intensity V is set equal to the last intensity used in generating the RGB components in the previous block and the saturation S is set to the saturation level of the next to last entry in the previous block at step 98.

At a step 100, the ultrasound system begins generating another block of RGB components, according to equation (1) above. At a step 102, a determination is made whether the saturation level of the RGB component generated in the step 100 is within the relationship:

$$S < S_0 + \Delta S \quad (6)$$

If the answer to step 102 is yes, meaning the saturation level is less than a second threshold saturation level given by the equation 6 above, then the intensity level V is increased by 1 and the saturation is updated according to equation (5) defined above. It will be appreciated that the second threshold saturation level given in equation (5) is greater than the first threshold saturation level given in equation (4). Processing then returns to step 100 and another set of RGB components is generated.

As can be seen in FIG. 5, the steps 100, 102, and 104 are repeated to generate a block 206 of RGB components. It will be appreciated that the lightness, or G component, of each entry in the block 206 remains the same but the saturation level for the RGB components increases.

Returning again to FIG. 4A, when it is determined at step 102 that the saturation level is no longer less than the second threshold saturation level, a determination is made at a step 107 whether the saturation level is greater than 1. If so, the generation of RGB components according to the step 84 is complete. If the saturation level is not greater than 1, then a determination is made at a step 108 of whether the lookup table contains less than a predetermined number, X, entries of RGB components. The predetermined number X may be any number. In a presently preferred embodiment, the number X corresponds to the maximum number of colors that may be displayed on the color monitor. For example, for an 8-bit color monitor, the predetermined number X is 256. If X is too large, then the saturation level may become greater than 1, and the step 107 will terminate the step 84 before X entries are generated. If, however, the saturation level is not greater than 1 and the table contains less than X number of entries, the intensity is set to the last intensity of the previous block and the saturation level is set to be the sum of the saturation level of the last entry in the previous block and the difference of the saturation levels of the last and next to last entries in the previous block according to the equation:

$$S_0=S_k+(S_k-S_{k-1}) \tag{7}$$

where k refers to the number of entries in the previous block. The above steps are continued until the lookup table contains X number of entries of RGB components or until the saturation level reaches a value of 1.

Figure 4B:
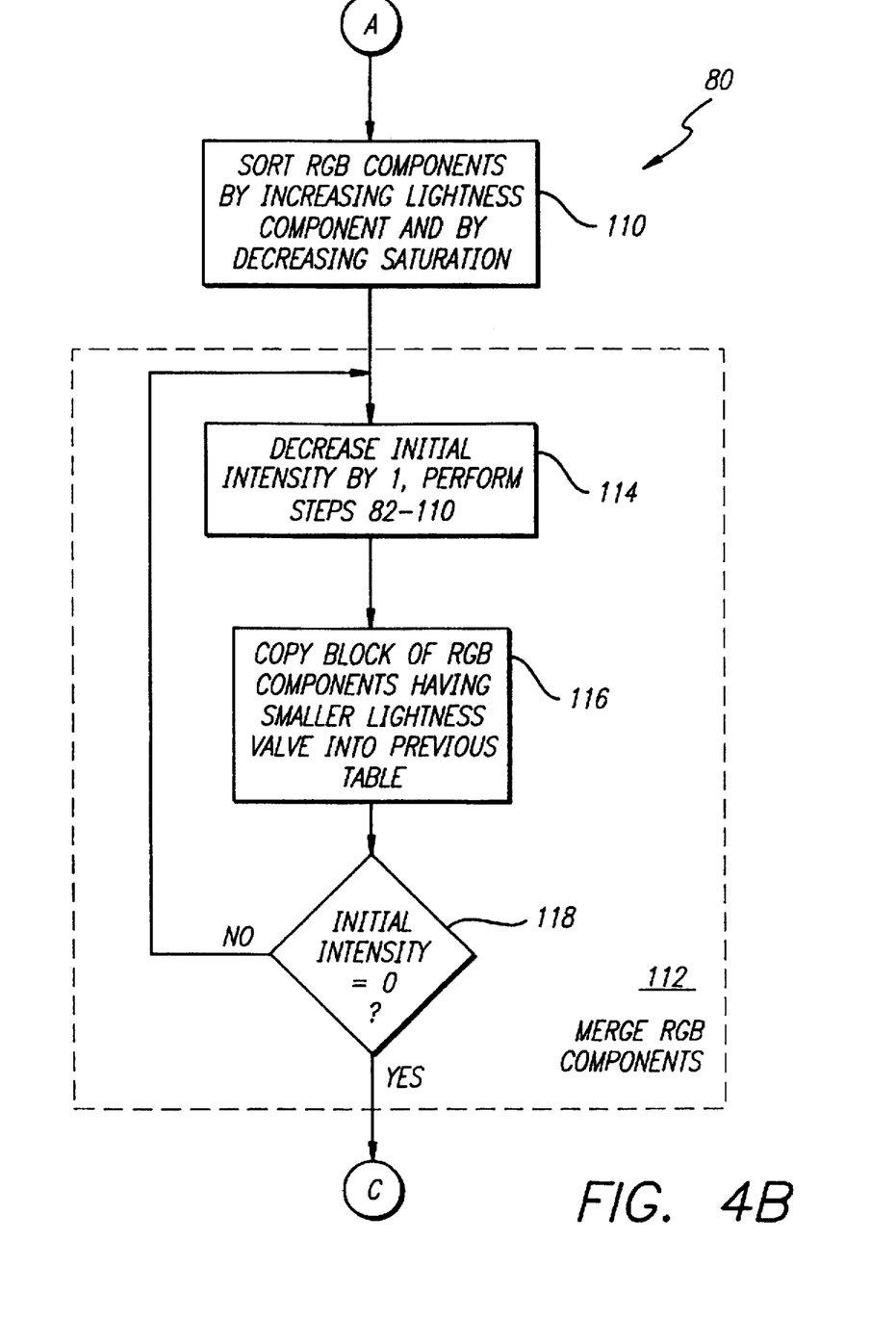

Turning now to FIG. 4B, the RGB components previously generated are sorted in order of increasing lightness components and decreasing saturation levels at a step 110. The results of the process undertaken at the step 110 are shown in FIG. 5B, where the table 210 is sorted in order of an increasing lightness component, which is currently the G component.

After the table has been sorted by the process of the step 110, a new table of RGB components is created. Beginning at a step 114, the initial intensity $V_0$ is decreased by 1 and the steps 82-110 described above are repeated. The results of the processes undertaken at step 114 are shown in FIG. 5C where a new table 212 is created and sorted. As can be seen, the table 212 of FIG. 5C contains a block 215 having lightness components that are smaller than the smallest lightness components in the previous table 210 shown in FIG. 5B.

Figure 5B:
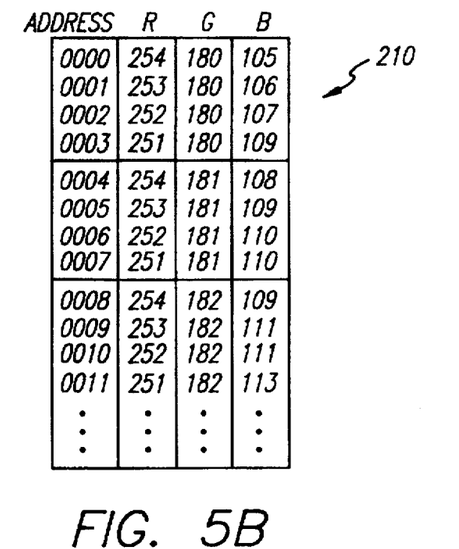
Figure 5C:
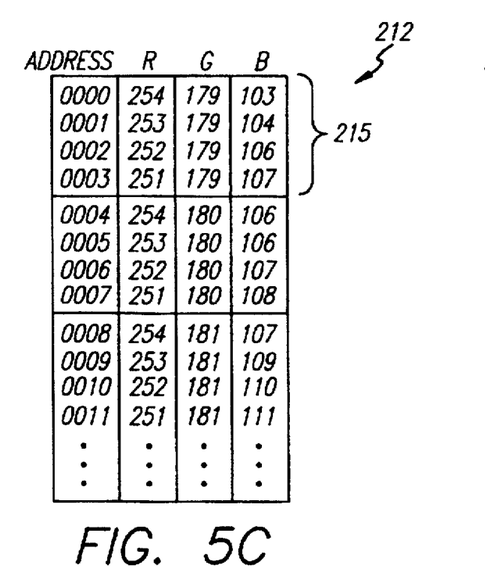
Figure 5D:
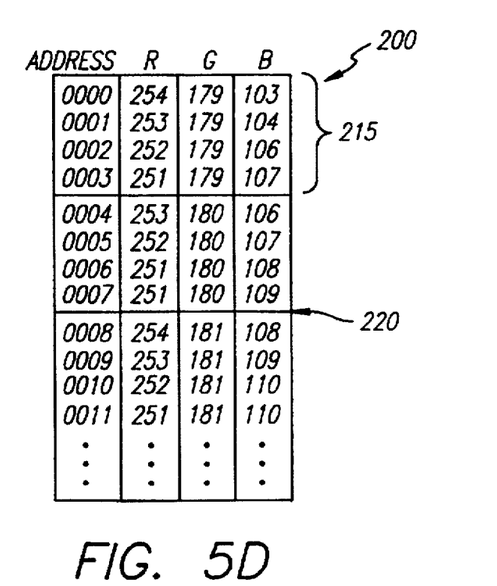

Referring now to FIGS. 4B, 5B, and 5C, the block 215 of RGB components having lightness components that are smaller than the smallest lightness components of the previous table is added to the beginning of the previous table 210 at a step 116. The result of step 116 is shown in FIG. 5D.

After step 116, a determination is made of whether the initial intensity used to create the new table has been decreased to zero. If not, processing returns to step 114 where the initial intensity is again decreased by one and another new table is created. As will be appreciated, the steps shown in FIGS. 4A and 4B are repeated for a number of times that equals the initial intensity value $V_0$ input by the user.

Figure 4C:
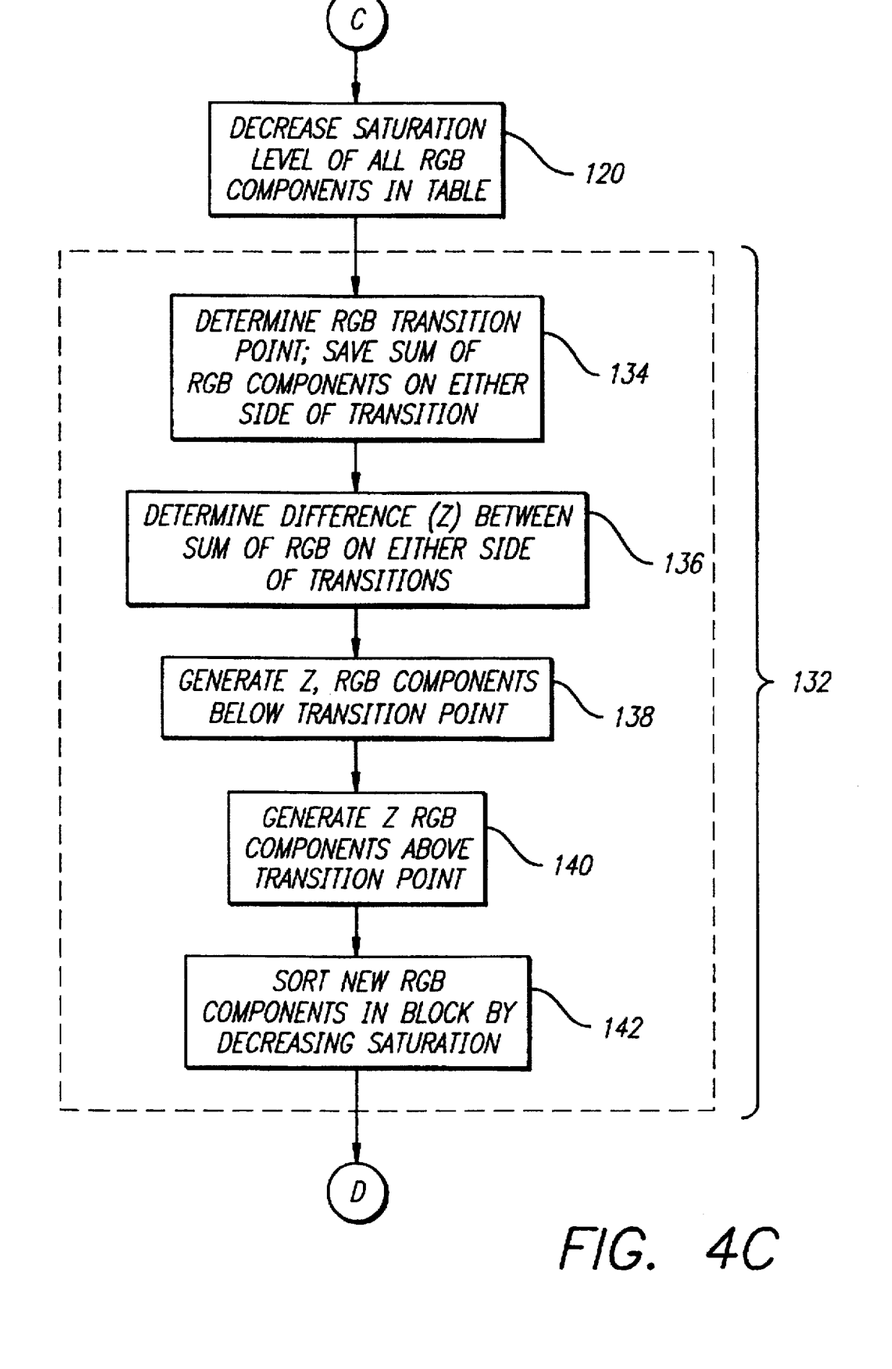
Figure 4D:
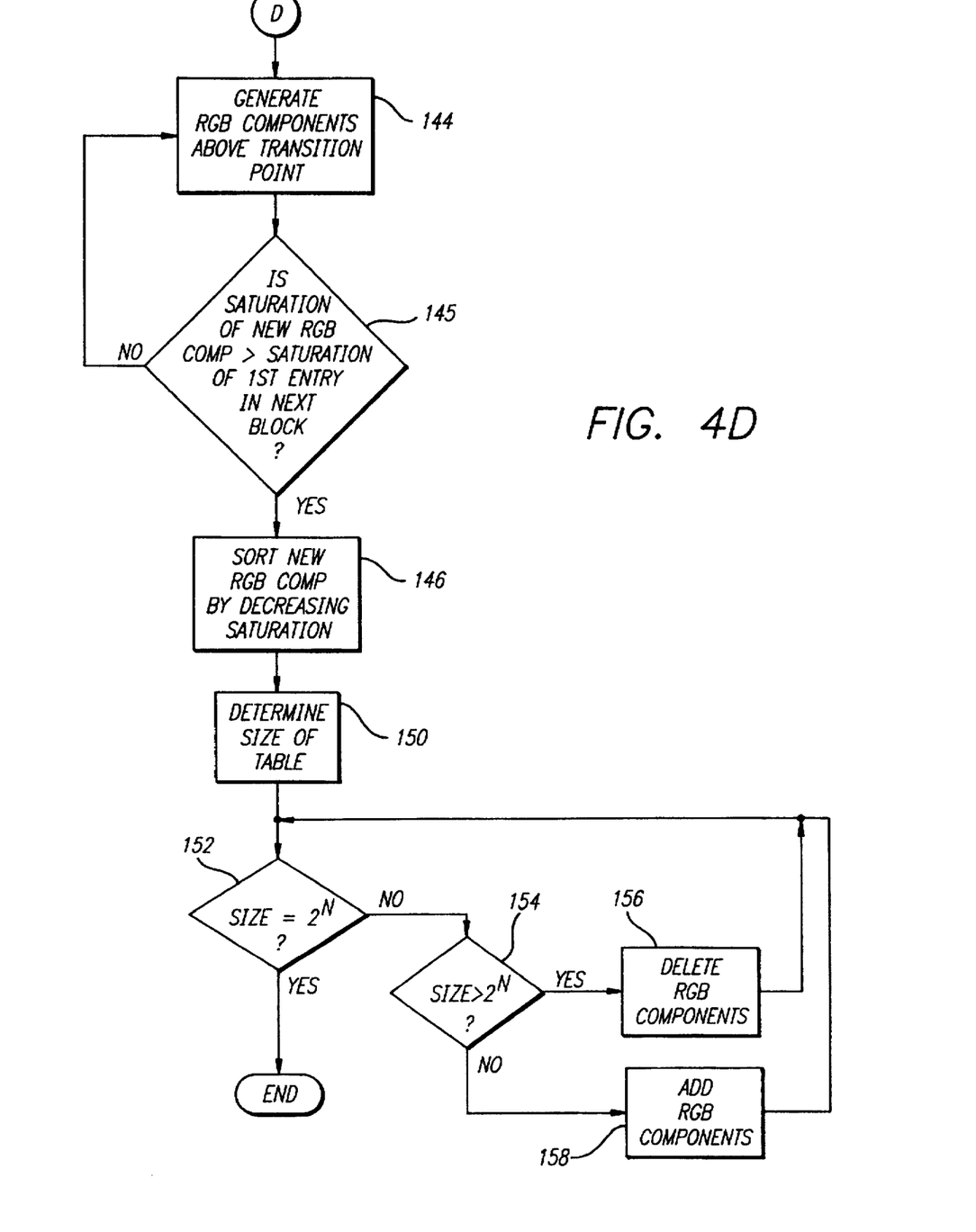
Figure 4E:
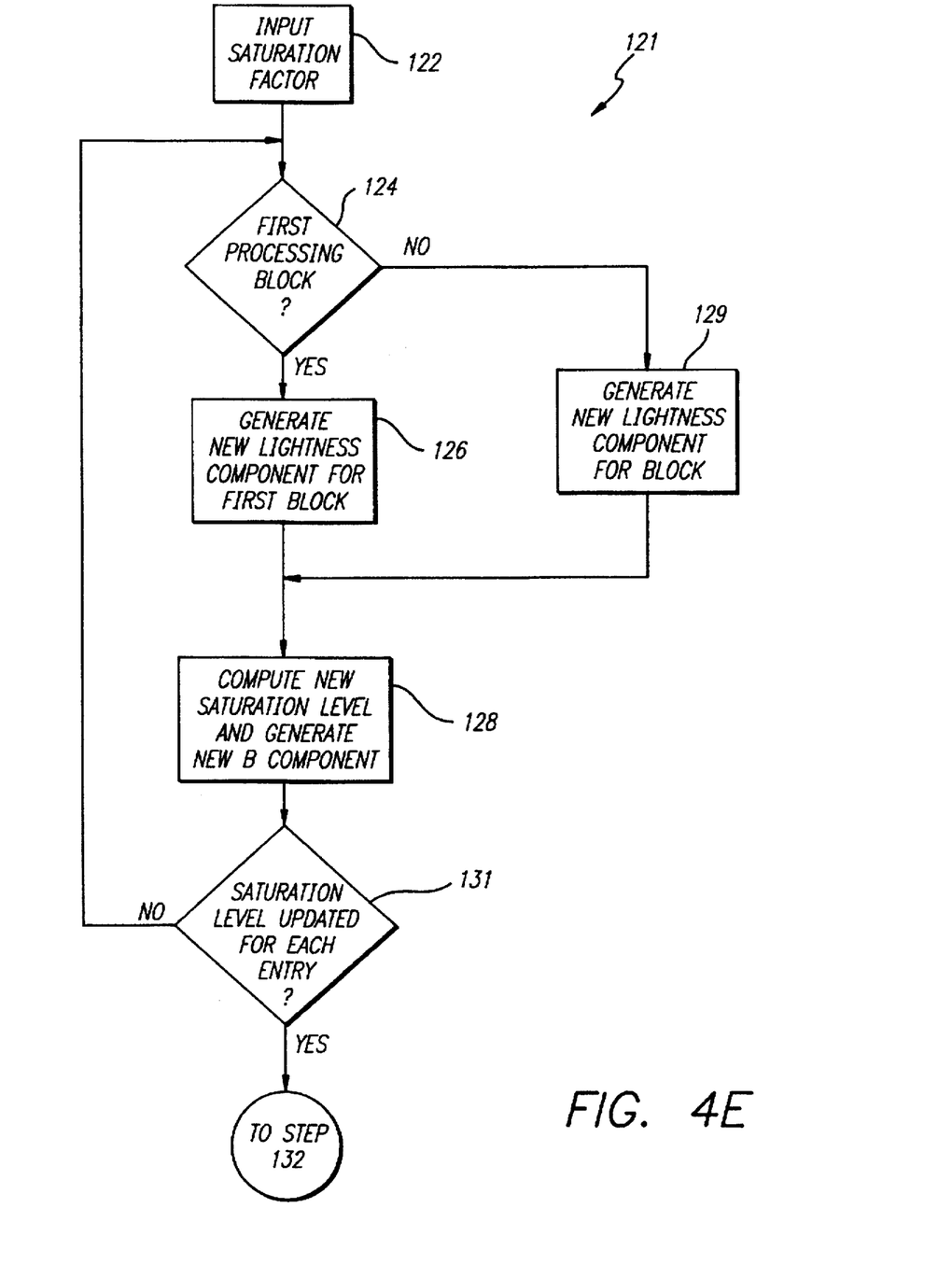

At this point in the generation of the lookup table 32, it will be appreciated that the size of the lookup table is a function of the distribution of the saturation levels. For reasons to be described below, it may be necessary to add some additional RGB entries to the table. To ensure that the saturation level of each entry does not exceed 1 as more RGB entries are made, the saturation level for all the RGB components in the table is reduced at a step 120. FIG. 4E shows a flow chart of a first suitable method 121 of performing the step 120. Beginning at a step 122, a saturation factor $\alpha_s$ having a value between 0 and 1 is input using the user interface 50. At a step 124, a determination is made whether the saturation level is being updated for the first processing block. If so, then at a step 126, a new lightness component is generated according to the equation:

$$G = \bar{r}\left(1 - \frac{\bar{s}\alpha_s}{2}\right), \tag{8}$$

where $\bar{s}$ is the mean of the saturation values for the first block, and $\bar{r}$ is the mean of the R component of the first block. At a step 128, a new saturation level S is generated according to the equation:

$$S = 2\left(1 - \frac{G}{R}\right) \tag{9}$$

Also in the step 128, a new B component is generated according to the equation:

$$B=R(1-S) \tag{10}$$

The value of R remains fixed and the new RGB components are added to the table.

After the first processing block, step 128 is bypassed and a step 129 generates a new lightness component Ghd jin each subsequent processing block according to the equation:

$$G'_j=G'_{j-1}+(G_j-G_{j-1}) \tag{11}$$

where, $G_j$ is the G component of the jth processing block before the saturation change made during the step 128 just performed. The new saturation levels and the new B components for the RGB components for the jth block are generated in accordance with equations (9) and (10) by the step 128 as described above. At a step 131, a determination is made whether the saturation level has been updated for each entry of RGB components. If not, the steps 124, 129, and 128 are repeated. When the step 131 determines that the saturation level of all RGB components has been updated, the process continues to a next step 132. As will be appreciated, the R component for the newly added entries remains fixed and the G and B components are increased. Thus, the saturation level of each RGB component added is decreased and the sum of each RGB component is increased.

Figure 4F:
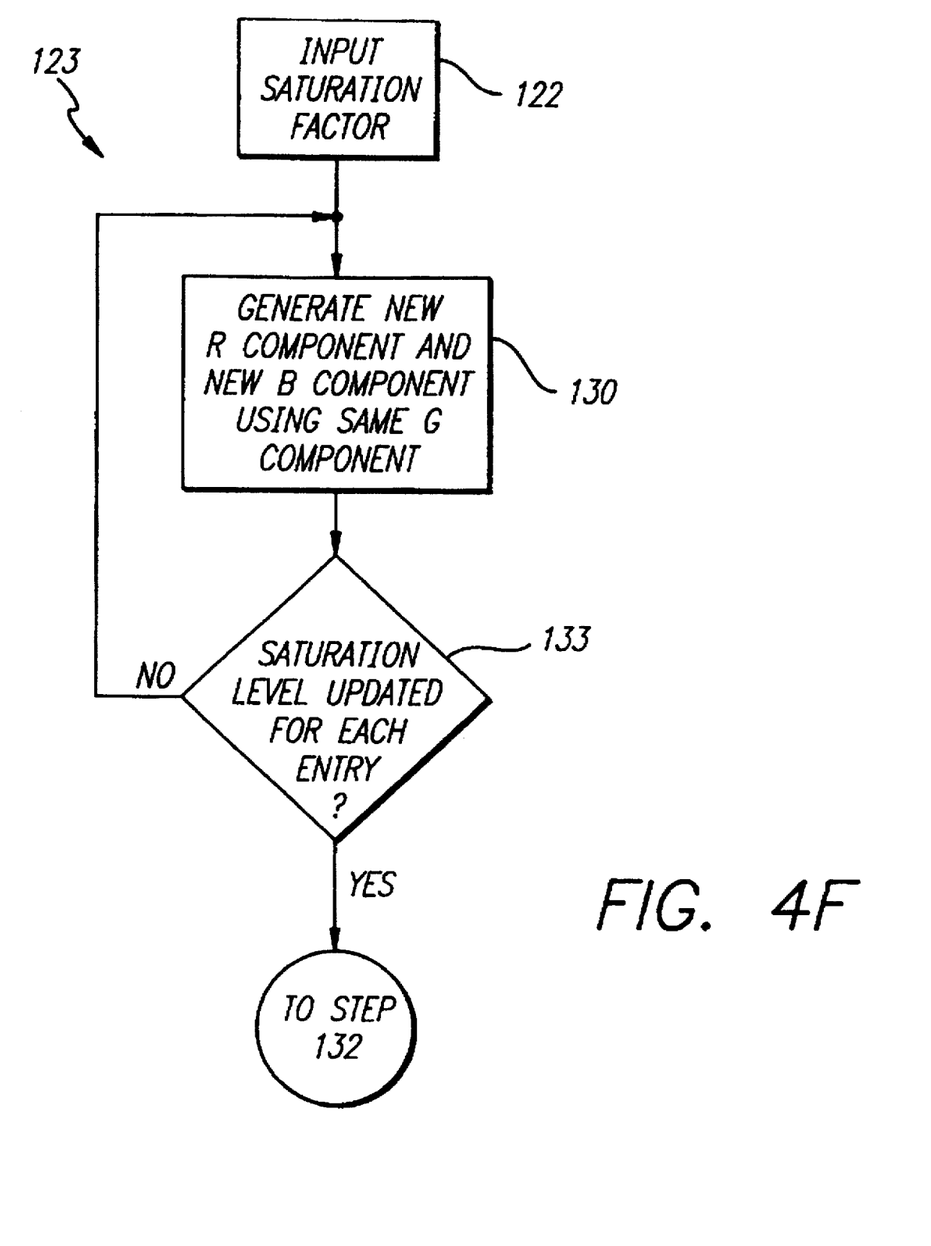

FIG. 4F shows another acceptable method 123 of performing the step 120, wherein the saturation level of each RGB component is decreased but the sum of the RGB components for each new entry remains unchanged. The step 122 of inputting the saturation factor $\alpha_s$ is performed as described above. At a step 130 new R and B components are generated but the G component remains unchanged. The new R component is generated according to the equation:

$$R = \frac{G}{1 - \frac{S\alpha_s}{2}} \tag{12}$$

and the new B component is generated according to the equation:

$$B=R(1-S\alpha_s) \tag{13}$$

The updated saturation level S is given by the equation:

$$S=S\alpha_s \tag{14}$$

It will be appreciated that the lightness component G is unaffected by the step 130. At a step 133, a determination is made whether the saturation level has been updated for each entry of RGB components. If not, the step 130 is repeated. When the step 133 determines that the saturation level of all RGB components has been updated, the process continues to the next step 132. It will be further appreciated that the sum of each RGB component entry remains the same, while the saturation level of the RGB component entries decreases in each processing block.

Once the saturation level at each of the RGB components has been reduced, the ultrasound system 10 operates to ensure that transitions between lightness components are as smooth as possible. There are several ways of smoothing the transitions. A first way is to smooth changes in saturation level at the transition points. This is shown generally at a group of steps 132 in FIG. 4C.

Beginning with a step 134, the ultrasound system analyzes each block in the table to determine the transition points. In addition, the sum of the RGB values for each entry on either side of the transition points is calculated and stored. At a step 136, the difference, Z, between the sum of the RGB components for the entry on each side of the transition point is determined. This difference Z determines the number of new RGB components that will be added to the table.

At a step 138, the ultrasound system 10 generates Z/2 pairs of RGB components below the particular transition point. Each pair of RGB entries is generated according to equations:

$$(R,G,B)=(R_0,G_0,B_0+1) \quad (15)$$

and $$(R,G,B)=(R_0+1,G_0,B_0) \quad (16)$$

where $R_0$, $G_0$, and $B_0$ are the first RGB components below the transition point.

At a step 140, the ultrasound system 10 generates another Z/2 pairs of RGB components above the particular transition point according to the equations:

$$(R,G,B)=(R_0, G_0, B_0-1) \quad (17)$$

and $$(R,G,B)=(R_0-1,G_0,B_0) \quad (16)$$

where $R_0$, $G_0$, and $B_0$ are the first RGB entries above the transition point.

Finally, both sets of new RGB components are sorted in order of decreasing saturation values as determined by equation (5) in a step 142.

It is also desirable to further smooth the transition between blocks of RGB components in terms of saturation level. Turning to FIG. 4D, at a step 142 the ultrasound system smoothes the transition point between two processing blocks in terms of saturation levels. At a step 144, a series of RGB components is generated above a transition point by increasing the R component by 1 and by decreasing the B component by 1. At a step 145, a determination is made whether the saturation level of the new RGB component entries is greater than the saturation level of the first RGB component entry in the processing block below the transition point. If not, then another set of RGB components is generated at the step 144. The steps 144 and 145 are continued until the saturation level of RGB components generated at the step 144 is bigger than the saturation level of the first RGB component of the processing block below the transition point. The RGB components generated at the step 144 have a same lightness component and a same sum of RGB components but have increasing saturation levels. At a step 146, the RGB components generated at the step 144 are sorted in decreasing order of saturation value.

At this point, the size of the lookup table is a function of saturation levels and may be larger or smaller than $2^N$ entries. The size of the table is therefore increased or decreased to contain $2^N$ entries. Beginning at a step 150, the size of the lookup table is determined. At a step 152 it is determined if the lookup table contains exactly $2^N$ RGB component entries. If so, then no further action is desired and generation of the lookup table is complete. At a step 154, it is determined if the size of the lookup table is greater than the $2^N$ entries. If so, RGB components are deleted from the table at step 156 until the lookup table contains $2^N$ entries. One suitable method of performing the step 156 is to delete the last RGB component of a processing block above each transition point. If the answer to the step 154 is no, i.e., the lookup table contains less than $2^N$ entries, then additional RGB components are added at a step 158. One suitable method of adding RGB components in the step 158 is to add an RGB component at the bottom of every other processing block by decreasing the R component by 1 and increasing the B component by 1 until the lookup table contains $2^N$ entries.

It will once again be appreciated that the single color used by the present invention is not limited to the red-dominant color with a hue constant of 0.5 as described in the nonlimiting example of the preferred embodiment. Again, as described above, any single color may be used. Further, it will be appreciated that the lookup table and the method of the present invention for generating the lookup table are not limited to ultrasound systems. The present invention may be suitably used in any imaging system that displays images in a single color. Some suitable uses, given by way of example only, without limiting the scope of the present invention, include CAT scanning, CT scanning, and magnetic resonance imaging (MRI). The present invention may be used in nonmedical imaging systems, such as sonar that displays a single-color, green-dominant or a blue-dominant image.

The embodiments of the invention in which an exclusive property or privilege is claimed are defined as follow:

1. A method of creating a single-color image that is representative of an echo signal, the method comprising:

sampling an echo signal so that each sample contains at least N bits in order to create a digital echo signal having at least $2^N$ possible values that determine a dynamic range of the digital echo signal;

generating a single-color lookup table having approximately $2^N$ RGB component entries, each entry defining a pixel having a unique hue, intensity, and saturation value;

mapping each sample of the digital echo signal to an RGB component entry of the single-color lookup table; and displaying the mapped RGB components on the display to produce a single-color image having a dynamic range that is substantially equal to the dynamic range of the digital echo signal.

2. The method of claim 1, wherein the single-color lookup table is generated by varying saturation values for the RGB components.

3. The method of claim 2, wherein the lookup table has $2^N$ unique addresses, each of which is associated with a unique RGB component, the method further comprising using the digitized echo signal as an address to the lookup table and retrieving the unique RGB components associated with the address to display the digitized echo signal.

4. The method of claim 2, wherein generating a single-color lookup table includes generating a plurality of groups of RGB components having a same lightness component.

5. The method of claim 4, wherein generating a single-color lookup table includes arranging the groups of RGB components in order of increasing lightness components.

6. The method of claim 5, wherein generating a single-color lookup table includes arranging RGB components of a group in order of decreasing saturation.

7. An ultrasound imaging system, comprising:

a transducer that directs ultrasound energy toward a target element in a patient and receives echo signals reflected from the target element;

a receiver coupled to the transducer that samples the echo signals to create a digitized echo signal, each sample having at least N bits, wherein the digitized echo signal has a dynamic range that is defined by the number of bits;

a memory that stores approximately $2^N$ RGB component entries, each RGB entry defining a pixel with a hue, saturation, and intensity value;

an image processor coupled to the receiver and the memory that associates a sample of the digitized echo signal with an RGB component entry stored in the memory; and a display that displays the associated RGB components as a pixel in an ultrasound image, the pixel having a dynamic range that is substantially equal to the dynamic range of the digitized echo signal.

8. The ultrasound imaging system of claim 7, wherein the memory is a lookup table having $2^N$ unique addresses, each address being associated with one of the approximately $2^N$ RGB component entries, the sample of the digitized echo signals being used as the address of the lookup table.

9. The ultrasound imaging system of claim 7, wherein each RGB entry defines a pixel having the same hue but a differing intensity and a differing saturation value.

10. The ultrasound imaging system of claim 9, wherein more than one RGB entry has a same lightness component.

* * * * *